US012763348B2

(12) United States Patent
Hoshi et al.

(10) Patent No.: US 12,763,348 B2
(45) Date of Patent: Oct. 13, 2026

(54) FUEL CELL SYSTEM

(71) Applicant: HONDA MOTOR CO., LTD., Tokyo (JP)

(72) Inventors: Yuta Hoshi, Wako (JP); Takumi Kawano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 583 days.

(21) Appl. No.: 18/368,088

(22) Filed: Sep. 14, 2023

(65) Prior Publication Data

US 2024/0105976 A1 Mar. 28, 2024

(30) Foreign Application Priority Data

Sep. 26, 2022 (JP) ................................ 2022-152248

(51) Int. Cl.

| | |
|---|---|
| ***H01M 8/04492*** | (2016.01) |
| ***C25B 1/04*** | (2021.01) |
| ***C25B 9/05*** | (2021.01) |
| ***H01M 8/04082*** | (2016.01) |
| ***H01M 8/04089*** | (2016.01) |
| ***H01M 8/04746*** | (2016.01) |
| ***H01M 8/04828*** | (2016.01) |

(Continued)

(52) U.S. Cl.

CPC ........... *H01M 8/04492* (2013.01); *C25B 1/04* (2013.01); *C25B 9/05* (2021.01); *H01M 8/04097* (2013.01); *H01M 8/04201* (2013.01); *H01M 8/04753* (2013.01); *H01M 8/04761* (2013.01); *H01M 8/04828* (2013.01); *H01M 8/0656* (2013.01); *H01M 8/0662* (2013.01)

(58) Field of Classification Search

CPC ......... H01M 8/04492; H01M 8/04097; H01M 8/04201; H01M 8/04753; H01M 8/04761; H01M 8/04828; H01M 8/0656; H01M 8/0662; H01M 8/04164; C25B 1/04

See application file for complete search history.

(56) References Cited

U.S. PATENT DOCUMENTS

| | | | | |
|---|---|---|---|---|
| 2009/0325015 A1 | 12/2009 | Fujita | | |
| 2010/0021778 A1* | 1/2010 | Steinshnider | ..... H01M 8/04164 | 429/410 |
| 2010/0304247 A1 | 12/2010 | Tamura et al. | | |

(Continued)

FOREIGN PATENT DOCUMENTS

| | | |
|---|---|---|
| CN | 1770526 A | 5/2006 |
| CN | 101536228 A | 9/2009 |

(Continued)

OTHER PUBLICATIONS

Eng Translation DE 2022-213507 (Year: 2022).*

(Continued)

*Primary Examiner* — Stephen J Yanchuk

(74) *Attorney, Agent, or Firm* — Carrier, Shende & Associates P.C.; Joseph P. Carrier; Fulchand P. Shende

(57) ABSTRACT

The fuel cell system includes a water electrolysis device, a first gas-liquid separator, an oxygen tank, a fuel cell, a second gas-liquid separator, and a controller. When the level of water in the first gas-liquid separator becomes lower than a predetermined threshold value, the controller supplies oxygen gas having a pressure higher than the internal pressure of the first gas-liquid separator to the second gas-liquid separator and opens the first on-off valve.

10 Claims, 3 Drawing Sheets

(51) Int. Cl.
*H01M 8/0656* (2016.01)
*H01M 8/0662* (2016.01)

(56) References Cited

U.S. PATENT DOCUMENTS

| | | | | |
|---|---|---|---|---|
| 2017/0018787 | A1 | 1/2017 | Sanderson et al. | |
| 2021/0261446 | A1 | 8/2021 | Asano et al. | |
| 2022/0311029 | A1* | 9/2022 | Mohri ............... | H01M 8/04225 |
| 2023/0261231 | A1 | 8/2023 | Takasugi et al. | |

FOREIGN PATENT DOCUMENTS

| | | | | |
|---|---|---|---|---|
| CN | 102361817 | A | 2/2012 | |
| CN | 106356542 | A | 1/2017 | |
| CN | 113293394 | A | 8/2021 | |
| DE | 102022213507 | A1 * | 6/2024 | ............... C25B 1/04 |
| JP | H09-120831 | A | 5/1997 | |
| JP | 2002-056880 | A | 2/2002 | |
| JP | 2007-073280 | A | 3/2007 | |
| JP | 2009-138253 | A | 6/2009 | |
| JP | 2013-023733 | A | 2/2013 | |
| JP | 2014-072119 | A | 4/2014 | |
| JP | 2016-015282 | A | 1/2016 | |
| JP | 2020-036542 | A | 3/2020 | |
| JP | 2021-130857 | A | 9/2021 | |
| JP | 2023-117525 | A | 8/2023 | |

OTHER PUBLICATIONS

Office Action dated Feb. 20, 2024 issued in the corresponding Japanese Patent Application No. 2022-152248 with the English machine translation thereof.
Office Action dated May 19, 2024 issued in the corresponding Chinese Patent Application No. 202311247704.4 with the English machine translation thereof.

* cited by examiner

FUEL CELL SYSTEM

CROSS-REFERENCE TO RELATED APPLICATIONS

This application is based upon and claims the benefit of priority from Japanese Patent Application No. 2022-152248 filed on Sep. 26, 2022, the contents of which are incorporated herein by reference.

BACKGROUND OF THE INVENTION

Field of the Invention

The present invention relates to a fuel cell system.

Description of the Related Art

In recent years, research and development have been conducted on fuel cells that contribute to energy efficiency in order to ensure that more people have access to affordable, reliable, sustainable and modern energy. Further, in order to reduce the load on the environment, emissions control has been more stringent for moving bodies such as automobiles having internal combustion engines. For this reason, attempts have been made to mount a fuel cell instead of an internal combustion engine in a moving object such as an automobile. Because $CO_2$, $SO_x$, $NO_x$, and the like are not discharged from the moving body on which the fuel cell is mounted, the burden on the environment can be reduced.

For example, JP 2016-015282 A discloses a fuel cell system including a fuel cell. In the fuel cell system disclosed in JP 2016-015282 A, when the water level in the high-pressure water tank reaches the lower limit by the operation of the water electrolysis device, the water level in the high-pressure water tank is adjusted to rise. In this case, the shutoff valves of the hydrogen tank and the oxygen tank are opened to supply hydrogen and oxygen to the fuel cell unit. Water generated by electrochemical reactions between hydrogen and oxygen supplied to the fuel cell unit is stored in a low-pressure water tank and then transferred to the high-pressure water tank by using a water supply pump.

SUMMARY OF THE INVENTION

However, in a case where the low-pressure water tank is a closed space, as the volume of water in the low-pressure water tank decreases due to the transfer of water from the low-pressure water tank to the high-pressure water tank, the internal pressure of the low-pressure water tank decreases. In this case, in the low-pressure water tank, the remaining water tends to boil. The water boiling in the low-pressure water tank raises concerns about adverse events such as inflow of water vapor from the low-pressure water tank into the fuel cell stack, leading to decrease in power generation efficiency.

An object of the present invention is to solve the above-described problems.

According to an aspect of the present invention, there is provided a fuel cell system including: a water electrolysis device configured to electrolyze water; a first gas-liquid separator configured to separate a fluid discharged from the water electrolysis device into a hydrogen gas and water to be resupplied to the water electrolysis device; an oxygen tank configured to store an oxygen gas having been produced by water electrolysis and having been pressurized; a fuel cell configured to generate electric power using the oxygen gas having been produced by the water electrolysis and having been pressurized; a second gas-liquid separator configured to store water in a mixed gas including an unreacted oxygen gas discharged from the fuel cell; a water level sensor configured to detect a level of the water stored in the first gas-liquid separator; and the controller configured to control opening and closing of a valve; wherein the controller supplies to the second gas-liquid separator the pressurized oxygen gas having a pressure higher than an internal pressure of the first gas-liquid separator when the level of water becomes lower than a predetermined threshold value, regardless of a state of the fuel cell; and open a first on-off valve disposed on a water supply path connecting the first gas-liquid separator to the second gas-liquid separator.

According to the above aspect, the water stored in the second gas-liquid separator can be transferred to the first gas-liquid separator while supplying a high-pressure gas to the second gas-liquid separator. Therefore, it is possible to suppress a decrease in the internal pressure of the second gas-liquid separator due to the transfer of water to the first gas-liquid separator. As a result, it is possible to suppress a decrease in power generation efficiency of the fuel cell due to evaporation of water remaining in the second gas-liquid separator.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

Figure 1:
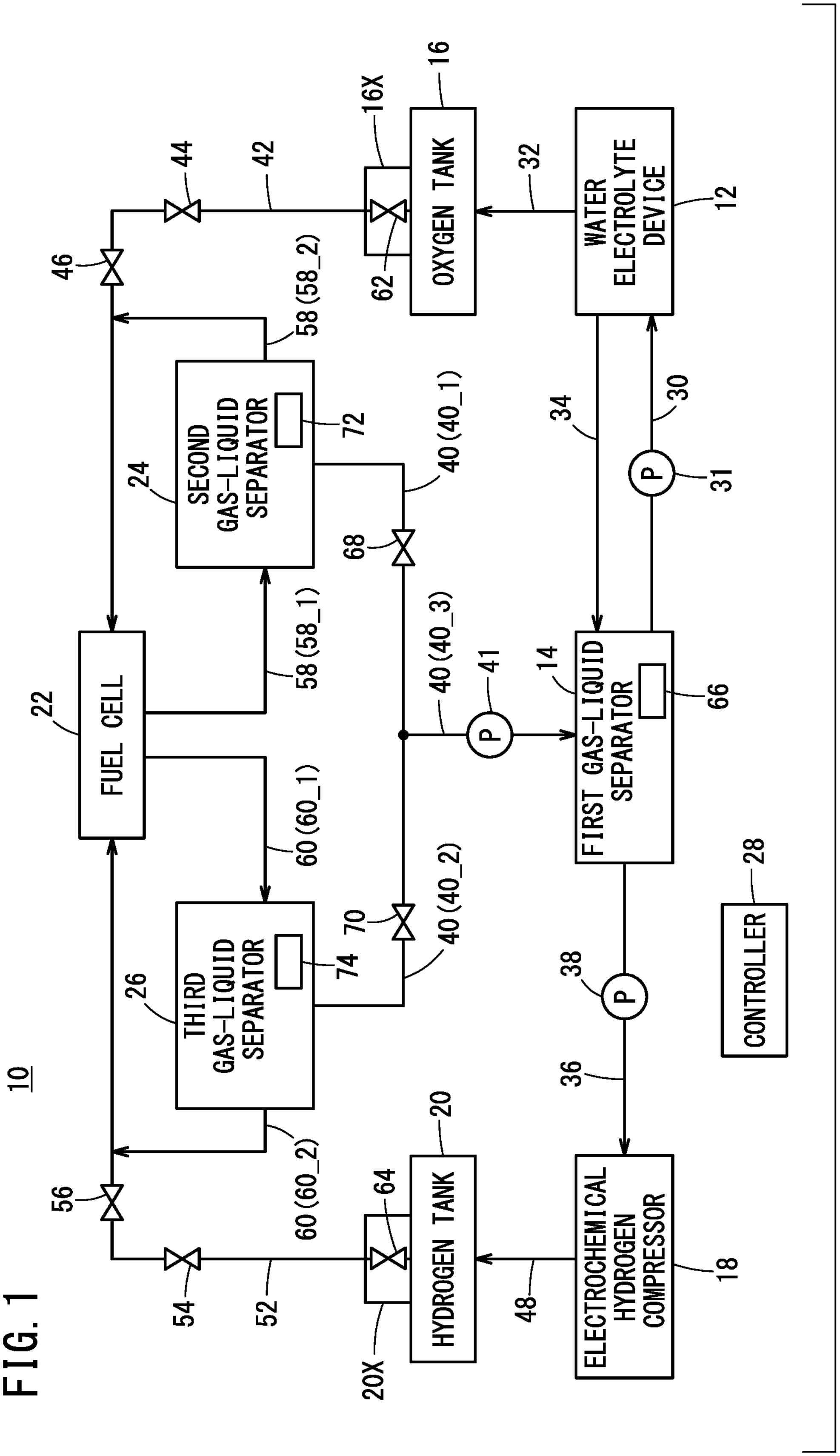
FIG. 1 is a schematic diagram showing a fuel cell system according to an embodiment.

FIG. 1 is a schematic diagram showing a fuel cell system 10. The fuel cell system 10 is used in a closed space. The fuel cell system 10 includes a water electrolysis device 12, a first gas-liquid separator 14, an oxygen tank 16, a hydrogen compressor 18, a hydrogen tank 20, a fuel cell 22, a second gas-liquid separator 24, a third gas-liquid separator 26, and a controller 28.

The water electrolysis device 12 is a differential pressure water electrolysis device that generates hydrogen gas and oxygen gas having a pressure higher than the pressure of the hydrogen gas by water electrolysis. Water for water electrolysis is supplied from the first gas-liquid separator 14 to the water electrolysis device 12 via the water supply path 30. The water supply path 30 allows the first gas-liquid separator 14 and the water electrolysis device 12 to communicate with each other. The water supply path 30 is provided with a pump 31. The pump 31 forces the water stored in the first gas-liquid separator 14 to flow toward the water electrolysis device 12.

The water electrolysis device 12 includes one or more unit cells. The unit cell includes a membrane electrode assembly (MEA) in which an electrolyte membrane is interposed between an anode and a cathode. The water electrolysis device 12 supplies water from the first gas-liquid separator

14 to the cathode of the unit cell. The unit cell electrolyzes water based on a voltage applied to the anode and the cathode. In this case, a high-pressure oxygen gas with its pressure increased is generated at the anode, and a hydrogen gas without its pressure increased is generated at the cathode.

The high-pressure oxygen gas generated in the unit cells of the water electrolysis device 12 is stored in the oxygen tank 16 via the oxygen discharge path 32. The oxygen discharge path 32 is a conduit for allowing the oxygen gas to flow from the water electrolysis device 12 to the oxygen tank 16 by connecting the water electrolysis device 12 to the oxygen tank 16.

The fluid discharged from the water electrolysis device 12 contains a hydrogen gas generated in the unit cells and residual water. The discharged fluid is supplied to the first gas-liquid separator 14 via the water discharge path 34. The water discharge path 34 is a conduit for allowing the discharged fluid to flow from the water electrolysis device 12 to the first gas-liquid separator 14 by connecting the water electrolysis device 12 to the first gas-liquid separator 14.

The first gas-liquid separator 14 separates the discharged fluid from the water electrolysis device 12 into a gaseous component (hydrogen gas) and a liquid component (liquid water). The gaseous component separated in the first gas-liquid separator 14 is supplied to the hydrogen compressor 18 via the hydrogen supply path 36. The hydrogen supply path 36 connects the first gas-liquid separator 14 to the hydrogen compressor 18. The hydrogen supply path 36 is provided with a pump 38. The pump 38 forces the hydrogen gas stored in the first gas-liquid separator 14 to flow toward the hydrogen compressor 18.

The liquid component (liquid water) separated in the first gas-liquid separator 14 is temporarily stored in the first gas-liquid separator 14 and is supplied to the water electrolysis device 12 via the water supply path 30. The water stored in the first gas-liquid separator 14 includes water supplied through the water supply path 40. The water supply passage 40 is a conduit for supplying water from the second gas-liquid separator 24 and the third gas-liquid separator 26 to the first gas-liquid separator 14. The water supply path 40 includes a first water supply path 40_1 and a second water supply path 40_2. The first water supply path 40_1 allows the second gas-liquid separator 24 and the first gas-liquid separator 14 to communicate with each other. The second water supply path 40_2 allows the third gas-liquid separator 26 and the first gas-liquid separator 14 to communicate with each other. In the present embodiment, the downstream end portion of the first water supply path 40_1 and the downstream end portion of the second water supply path 40_2 are formed as one merging path 40_3. The merging path 40_3 is provided with a pump 41. The pump 41 forces water stored in the second gas-liquid separator 24 or the third gas-liquid separator 26 to flow toward the first gas-liquid separator 14.

The oxygen tank 16 stores the high-pressure oxygen gas generated by the water electrolysis in the water electrolysis device 12. The high-pressure oxygen gas stored in the oxygen tank 16 is supplied from the outlet 16X of the oxygen tank 16 to the fuel cell 22 via the oxygen gas supply path 42. The oxygen gas supply path 42 is a conduit for allowing the high-pressure oxygen gas stored in the oxygen tank 16 to flow to the fuel cell 22 by connecting the oxygen tank 16 to the fuel cell 22. The oxygen gas supply path 42 is provided with a pressure reducing valve 44 and a shutoff valve 46. The pressure reducing valve 44 reduces the pressure of the high-pressure oxygen gas that has been stored in the oxygen tank 16. The pressure of the oxygen gas reduced by the pressure reducing valve 44 is still higher than the reference pressure. In the present embodiment, the reference pressure is the pressure of the hydrogen gas generated by the water electrolysis in the water electrolysis device 12. When an abnormality is detected, the shutoff valve 46 autonomously shuts off the oxygen gas supply path 42.

The hydrogen compressor 18 is an electrochemical hydrogen compressor also referred to as "EHC". The electrochemical hydrogen compressor 18 raises the pressure of the hydrogen gas supplied from the first gas-liquid separator 14 to generate a high-pressure hydrogen gas. The hydrogen gas supplied from the first gas-liquid separator 14 is the hydrogen gas generated by the water electrolysis device 12.

The electrochemical hydrogen compressor 18 has one or more unit cells. The unit cell includes a membrane electrode assembly (MEA) in which an electrolyte membrane is interposed between an anode and a cathode. The electrochemical hydrogen compressor 18 supplies the hydrogen gas supplied from the first gas-liquid separator 14 to the anode of the unit cell. The unit cell ionizes the hydrogen gas based on a voltage applied between the anode and the cathode. Protons obtained by ionizing the hydrogen gas reach the cathode via the electrolyte membrane, whereby pressurized hydrogen gas is generated.

The high-pressure hydrogen gas generated in the unit cells of the electrochemical hydrogen compressor 18 is stored in the hydrogen tank 20 via the hydrogen discharge path 48. The hydrogen discharge path 48 is a conduit for allowing the hydrogen gas to flow from the electrochemical hydrogen compressor 18 to the hydrogen tank 20 by connecting the electrochemical hydrogen compressor 18 to the hydrogen tank 20.

The hydrogen tank 20 stores the high-pressure hydrogen gas the pressure of which has been raised by the electrochemical hydrogen compressor 18. The high-pressure hydrogen gas stored in the hydrogen tank 20 is supplied from the outlet 20X of the hydrogen tank 20 to the fuel cell 22 via the hydrogen gas supply path 52. The hydrogen gas supply path 52 is a conduit for allowing the high-pressure hydrogen gas stored in the hydrogen tank 20 to flow to the fuel cell 22 by connecting the hydrogen tank 20 to the fuel cell 22. The hydrogen gas supply path 52 is provided with a pressure reducing valve 54 and a shutoff valve 56. The pressure reducing valve 54 reduces the pressure of the high-pressure hydrogen gas stored in the hydrogen tank 20. The pressure of the hydrogen gas reduced by the pressure reducing valve 54 is still higher than the reference pressure. When an abnormality is detected, the shutoff valve 56 autonomously shuts off the hydrogen gas supply path 52.

The fuel cell 22 has a plurality of unit cells. Each unit cell includes a membrane electrode assembly (MEA) in which an electrolyte membrane is interposed between an anode and a cathode. In the fuel cell 22, the oxygen gas having a pressure higher than the reference pressure is supplied from the oxygen tank 16 via the pressure reducing valve 44 to the cathode of each unit cell. In the fuel cell 22, the hydrogen gas having a pressure higher than the reference pressure is supplied from the hydrogen tank 20 via the pressure reducing valve 54 to the anode of each unit cell. Each unit cell generates electric power by electrochemical reactions between the oxygen gas and the hydrogen gas.

The oxygen-containing gas containing the oxygen gas unreacted in each unit cell of the fuel cell 22 is supplied to the oxygen gas supply path 42 via the oxygen-containing gas discharge path 58. The oxygen-containing gas discharge path 58 is a conduit for returning the oxygen-containing gas discharged from the fuel cell 22 to the oxygen gas supply path 42. The oxygen-containing gas discharge path 58 includes an upstream portion 58_1 and a downstream portion 58_2. The upstream portion 58_1 connects the fuel cell 22 to the second gas-liquid separator 24. The downstream portion 58_2 connects the second gas-liquid separator 24 to the oxygen gas supply path 42. In the present embodiment, one end of the downstream portion 58_2 is connected to the oxygen gas supply path 42 between the fuel cell 22 and the shutoff valve 46.

The hydrogen-containing gas containing hydrogen gas unreacted in each unit cell of the fuel cell 22 is supplied to the hydrogen gas supply path 52 via the hydrogen-containing gas discharge path 60. The hydrogen-containing gas discharge path 60 is a conduit for returning the hydrogen-containing gas discharged from the fuel cell 22 to the hydrogen gas supply path 52. The hydrogen-containing gas discharge path 60 includes an upstream portion 60_1 and a downstream portion 60_2. The upstream portion 60_1 connects the fuel cell 22 to the third gas-liquid separator 26. The downstream portion 60_2 connects the third gas-liquid separator 26 to the hydrogen gas supply path 52. In the present embodiment, one end of the downstream portion 60_2 is connected to the hydrogen gas supply path 52 between the fuel cell 22 and the shutoff valve 56.

The second gas-liquid separator 24 separates the oxygen-containing gas discharged from the fuel cell 22 into a gaseous component (oxygen gas) and a liquid component (liquid water). The gaseous component separated by the second gas-liquid separator 24 is supplied to the oxygen gas supply path 42 via the downstream portion 58_2 of the oxygen-containing gas discharge path 58. The liquid component (liquid water) separated by the second gas-liquid separator 24 is the water generated by oxidation-reduction reactions between oxygen and hydrogen in each unit cell of the fuel cell 22. The liquid component (liquid water) is temporarily stored in the second gas-liquid separator 24 and is supplied to the first gas-liquid separator 14.

The third gas-liquid separator 26 separates the hydrogen-containing gas discharged from the fuel cell 22 into a gaseous component (hydrogen gas) and a liquid component (liquid water). The gaseous component separated by the third gas-liquid separator 26 is supplied to the hydrogen gas supply path 52 via the downstream portion 60_2 of the hydrogen-containing gas discharge path 60. The liquid component (liquid water) separated by the third gas-liquid separator 26 is the water generated by oxidation-reduction reactions between oxygen and hydrogen in each unit cell of the fuel cell 22. The liquid component (liquid water) is temporarily stored in the third gas-liquid separator 26 and is supplied to the first gas-liquid separator 14.

The controller 28 is a computer that controls the fuel cell system 10. The controller 28 includes one or more processors and a storage medium. The storage medium may be constituted by a volatile memory and a non-volatile memory. Examples of such a processor may include a CPU (Central Processing Unit), an MCU, or the like. As an example of the volatile memory, there may be cited a RAM or the like. As an example of the nonvolatile memory, there may be cited a ROM, a flash memory, or the like.

The controller 28 turns on a power supply of the water electrolysis device 12 to apply a voltage to the anode and the cathode of the unit cell. In addition, the controller 28 drives the pump 31 to supply water from the first gas-liquid separator 14 to the water electrolysis device 12. The water electrolysis device 12 in an operating state performs electrolysis of water (water electrolysis). When the controller 28 stops applying the voltage to the unit cell and supplying water to the water electrolysis device 12, the water electrolysis device 12 stops.

The controller 28 turns on a power supply of the electrochemical hydrogen compressor 18 to apply a voltage to the anode and the cathode of the unit cell. In addition, the controller 28 drives the pump 38 to supply hydrogen gas from the first gas-liquid separator 14 to the electrochemical hydrogen compressor 18. The electrochemical hydrogen compressor 18 in an operating state raises the pressure of the hydrogen gas. When the controller 28 stops applying the voltage to the unit cell and supplying the hydrogen gas to the electrochemical hydrogen compressor 18, the electrochemical hydrogen compressor 18 stops.

The operation of the water electrolysis device 12 is paired with the operation of the electrochemical hydrogen compressor 18. That is, when the controller 28 brings the water electrolysis device 12 into the operating state, the controller 28 also brings the electrochemical hydrogen compressor 18 into the operating state. On the other hand, when the controller 28 stops the water electrolysis device 12, the controller 28 also stops the electrochemical hydrogen compressor 18.

During the operation of the water electrolysis device 12 and the electrochemical hydrogen compressor 18, the high-pressure oxygen gas generated by water electrolysis of the water electrolysis device 12 is stored in the oxygen tank 16, and the high-pressure hydrogen gas compressed by the electrochemical hydrogen compressor 18 is stored in the hydrogen tank 20. During the operation of the water electrolysis device 12 and the electrochemical hydrogen compressor 18, the controller 28 closes the oxygen valve 62 provided on the outlet 16X of the oxygen-tank 16 and the hydrogen valve 64 provided on the outlet 20X of the hydrogen-tank 20, respectively. In this case, the high-pressure oxygen gas stored in the oxygen tank 16 and the high-pressure hydrogen gas stored in the hydrogen tank 20 are not supplied to the fuel cell 22. Therefore, the fuel cell 22 is stopped and power generation is not performed.

On the other hand, while the water electrolysis device 12 and the electrochemical hydrogen compressor 18 are stopped, the controller 28 opens the oxygen valve 62 and the hydrogen valve 64 to bring the fuel cell 22 into an operating state. In this case, the high-pressure oxygen gas stored in the oxygen tank 16 is supplied to the fuel cell 22 after the pressure of the oxygen is reduced by the pressure reducing valve 44. The high-pressure hydrogen gas stored in the hydrogen tank 20 is supplied to the fuel cell 22 after the pressure of the hydrogen is reduced by the pressure reducing valve 54. The fuel cell 22 generates electric power.

The operation of the water electrolysis device 12 and the electrochemical hydrogen compressor 18 and the operation of the fuel cell 22 may be alternately performed.

The controller 28 monitors the level of the water stored in the first gas-liquid separator 14 regardless of whether or not the water electrolysis device 12 and the electrochemical hydrogen compressor 18 are in the operating state. The controller 28 compares, with a predetermined threshold value, the water level detected by a water level sensor 66 provided in the first gas-liquid separator 14.

When the level of the water stored in the first gas-liquid separator 14 becomes lower than the threshold value, the controller 28 opens at least one of the first on-off valve 68 and the second on-off valve 70 provided in the water supply path 40. In this case, at least one of the second gas-liquid separator 24 and the third gas-liquid separator 26 is connected to the first gas-liquid separator 14, and the first gas-liquid separator 14 is replenished with water.

When the water electrolysis device 12 and the electrochemical hydrogen compressor 18 are in the operating state, the oxygen valve 62 is closed as described above. When the first on-off valve 68 is opened in this state, the internal pressure of the second gas-liquid separator 24 decreases due to the transfer of water from the second gas-liquid separator 24 to the first gas-liquid separator 14. As a result, the water remaining in the second gas-liquid separator 24 tends to boil. Similarly, when the water electrolysis device 12 and the electrochemical hydrogen compressor 18 are in the operating state, the hydrogen valve 64 is closed. When the second on-off valve 70 is opened in this state, the internal pressure of the third gas-liquid separator 26 decreases due to the transfer of water from the third gas-liquid separator 26 to the first gas-liquid separator 14. As a result, the water remaining in the third gas-liquid separator 26 tends to boil.

Therefore, when the level of the water stored in the first gas-liquid separator 14 becomes lower than the threshold value during the operation of the water electrolysis device 12 and the electrochemical hydrogen compressor 18, the controller 28 opens the oxygen valve 62 before opening the first on-off valve 68 in an attempt to supply the high-pressure oxygen gas to the second gas-liquid separator 24 via the fuel cell 22. Similarly, before opening the second on-off valve 70, the controller 28 opens the hydrogen valve 64 to supply the high-pressure hydrogen gas to the third gas-liquid separator 26 via the fuel cell 22.

When the water electrolysis device 12 and the electrochemical hydrogen compressor 18 are in the non-operating state, the oxygen valve 62 and the hydrogen valve 64 are open as described above. That is, the oxygen valve 62 and the hydrogen valve 64 are already in an open state before the first on-off valve 68 or the second on-off valve 70 is opened. Therefore, when the level of the water stored in the first gas-liquid separator 14 becomes lower than the threshold value while the water electrolysis device 12 and the electrochemical hydrogen compressor 18 are not in operation, the controller 28 simply opens at least one of the first on-off valve 68 and the second on-off valve 70.

As described above, when the level of the water in the first gas-liquid separator 14 reaches the predetermined threshold value, the controller 28 opens at least one of the first on-off valve 68 and the second on-off valve 70 regardless of the state of the fuel cell 22. The valve opening is performed in a state where the high-pressure gas higher than the internal pressure of the first gas-liquid separator 14 is supplied to the second gas-liquid separator 24 or the third gas-liquid separator 26.

Thus, the water stored in the second gas-liquid separator 24 or the third gas-liquid separator 26 can be transferred to the first gas-liquid separator 14 while the high-pressure gas is supplied to the one from which the water is to be transferred. Therefore, a decrease in the internal pressure of either the second gas-liquid separator 24 or the third gas-liquid separator 26, otherwise caused by the transfer of water to the first gas-liquid separator 14, can be suppressed. As a result, it is possible to suppress a decrease in power generation efficiency of the fuel cell 22 due to evaporation of water remaining in either the second gas-liquid separator 24 or the third gas-liquid separator 26. Further, since the gas supplied to the second gas-liquid separator 24 or the third gas-liquid separator 26 has a high pressure, the pump 41 can be removed.

The state of the fuel cell 22 refers to a state whether the fuel cell 22 is operating or not operating. Normally, in a state where the fuel cell 22 is not operating, the oxygen gas and the hydrogen gas are not supplied to the fuel cell 22, the second gas-liquid separator 24, and the third gas-liquid separator 26. When the level of water in the first gas-liquid separator 14 becomes lower than the predetermined threshold value, the oxygen gas (or the hydrogen gas) is supplied to the second gas-liquid separator 24 (or the third gas-liquid separator 26) so that the internal pressure of the second gas-liquid separator 24 becomes higher than the internal pressure of the first gas-liquid separator 14 even if the fuel cell 22 is not in operation.

Figure 2:
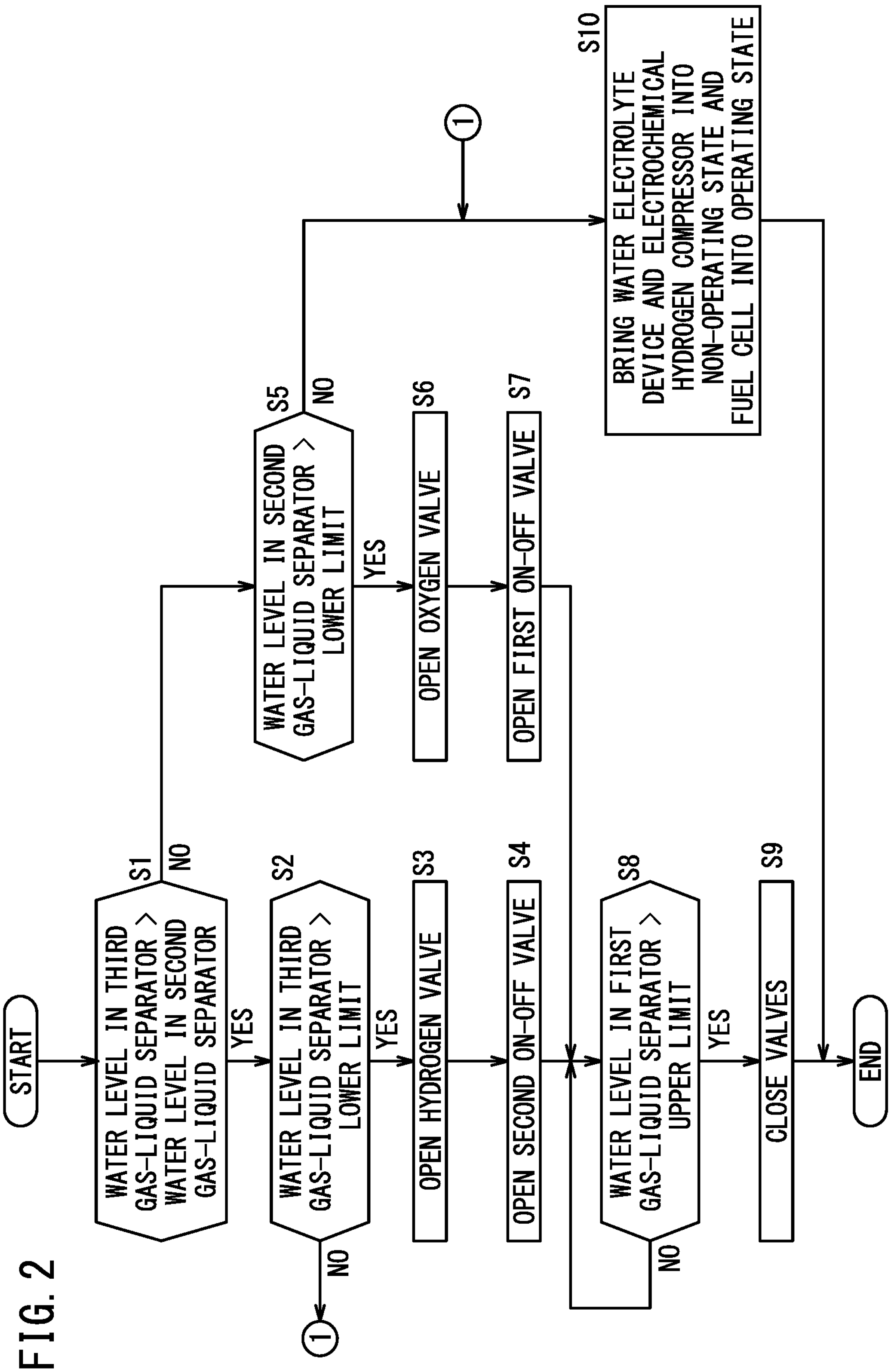
FIG. 2 is a flow chart showing a control processing procedure of the controller.

Next, a control processing performed by the controller 28 for opening one of the first on-off valve 68 and the second on-off valve 70 will be described. FIG. 2 is a flow chart showing a control processing procedure of the controller 28. FIG. 2 shows the procedure of the control processing in the case where the water electrolysis device 12 and the electrochemical hydrogen compressor 18 are in the operating state and the oxygen valve 62 and the hydrogen valve 64 are closed.

The control processing is started when the water level in the first gas-liquid separator 14 becomes lower than the threshold value, and transitions to step S1.

In step S1, the controller 28 compares the level of water stored in the second gas-liquid separator 24 (the water level in the second gas-liquid separator 24) with the level of water stored in the third gas-liquid separator 26 (the water level in the third gas-liquid separator 26). The water level in the second gas-liquid separator 24 is detected by a water level sensor 72 provided in the second gas-liquid separator 24. The water level in the third gas-liquid separator 26 is detected by a water level sensor 74 provided in the third gas-liquid separator 26. When the water level in the third gas-liquid separator 26 is higher than the water level in the second gas-liquid separator 24, the control processing transitions to step S2. On the other hand, when the water level in the second gas-liquid separator 24 is higher than the water level in the third gas-liquid separator 26, the control processing transitions to step S5.

In step S2, the controller 28 compares the water level in the third gas-liquid separator 26 with a predetermined lower limit. This lower limit is a value set in advance according to the capacity and the like of the storage portion of the third gas-liquid separator 26. In the case where the water level in the third gas-liquid separator 26 is higher than the lower limit, the control processing transitions to step S3. On the other hand, in the case where the water level in the third gas-liquid separator 26 is equal to or lower than the lower limit, the control processing transitions to step S10.

In step S3, the controller 28 opens the hydrogen valve 64 to supply the hydrogen-containing gas having a pressure higher than the reference pressure to the third gas-liquid separator 26 via the fuel cell 22. When the hydrogen valve 64 is opened, the control processing transitions to step S4.

In step S4, the controller 28 opens the second on-off valve 70 to allow the third gas-liquid separator 26 to communicate with the first gas-liquid separator 14, thereby replenishing the first gas-liquid separator 14 with water. When the second on-off valve 70 is opened, the control processing transitions to step S8.

In step S5, the controller 28 compares the water level in the second gas-liquid separator 24 with a predetermined lower limit. This lower limit is a value set in advance according to the capacity and the like of the storage portion of the second gas-liquid separator 24. The lower limit to be compared with the water level in the second gas-liquid separator 24 and the lower limit to be compared with the water level in the third gas-liquid separator 26 may be the same or different. In the case where the water level of the second gas-liquid separator 24 is higher than the lower limit, the control processing transitions to step S6. On the other hand, when the water level in the second gas-liquid separator 24 is equal to or lower than the lower limit, the control processing transitions to step S10.

In step S6, the controller 28 opens the oxygen valve 62 to supply the oxygen-containing gas having a pressure higher than the reference pressure to the second gas-liquid separator 24 via the fuel cell 22. When the oxygen valve 62 is opened, the control processing proceeds to step S7.

In step S7, the controller 28 opens the first on-off valve 68 to allow the second gas-liquid separator 24 to communicate with the first gas-liquid separator 14, thereby replenishing the first gas-liquid separator 14 with water. When the first on-off valve 68 is opened, the control processing transitions to step S8.

In step S8, the controller 28 compares the level of water stored in the first gas-liquid separator 14 (the water level in the first gas-liquid separator 14) with a predetermined upper limit. This upper limit is a value set in advance in accordance with the capacity and the like of the storage portion of the first gas-liquid separator 14. The water level in the first gas-liquid separator 14 is detected by a water level sensor 66 provided in the first gas-liquid separator 14. In the case where the water level of the first gas-liquid separator 14 is equal to or lower than the upper limit, the control processing remains at step S8. On the other hand, in the case where the water level in the first gas-liquid separator 14 becomes higher than the upper limit, the control processing transitions to step S9.

In step S9, the controller 28 closes the hydrogen valve 64 and the second on-off valve 70, or closes the oxygen valve 62 and the first on-off valve 68. In the case where the water level in the third gas-liquid separator 26 is higher than the water level in the second gas-liquid separator 24 and is higher than the lower limit (steps S1 and S2: YES), the hydrogen valve 64 and the second on-off valve 70 are opened. In this case, the controller 28 closes the hydrogen valve 64 and the second on-off valve 70 that have been opened. On the other hand, when the water level in the second gas-liquid separator 24 is higher than the water level in the third gas-liquid separator 26 and is higher than the lower limit (step S1: NO, step S5: YES), the oxygen valve 62 and the first on-off valve 68 are opened. In this case, the controller 28 closes the oxygen valve 62 and the first on-off valve 68. When the hydrogen valve 64 and the second on-off valve 70 are closed or the oxygen valve 62 and the first on-off valve 68 are closed, the control processing is ended.

In step S10, the controller 28 brings the water-electrolysis device 12 and the electrochemical hydrogen compressor 18 into a non-operating state. Thereafter, the controller 28 opens the oxygen valve 62 and the hydrogen valve 64 to bring the fuel cell 22 into an operating state, and replenishes the second gas-liquid separator 24 and the third gas-liquid separator 26 with water.

In this way, the controller 28 opens the first on-off valve 68 or the second on-off valve 70 so that the second gas-liquid separator 24 or the third gas-liquid separator 26 having a high water level communicates with the first gas-liquid separator 14. As a result, depletion of water in the second gas-liquid separator 24 or the third gas-liquid separator 26 due to transfer of water to the first gas-liquid separator 14 can be reduced.

The above-described embodiment may be modified as described below.

Modified Embodiment 1

Figure 3:
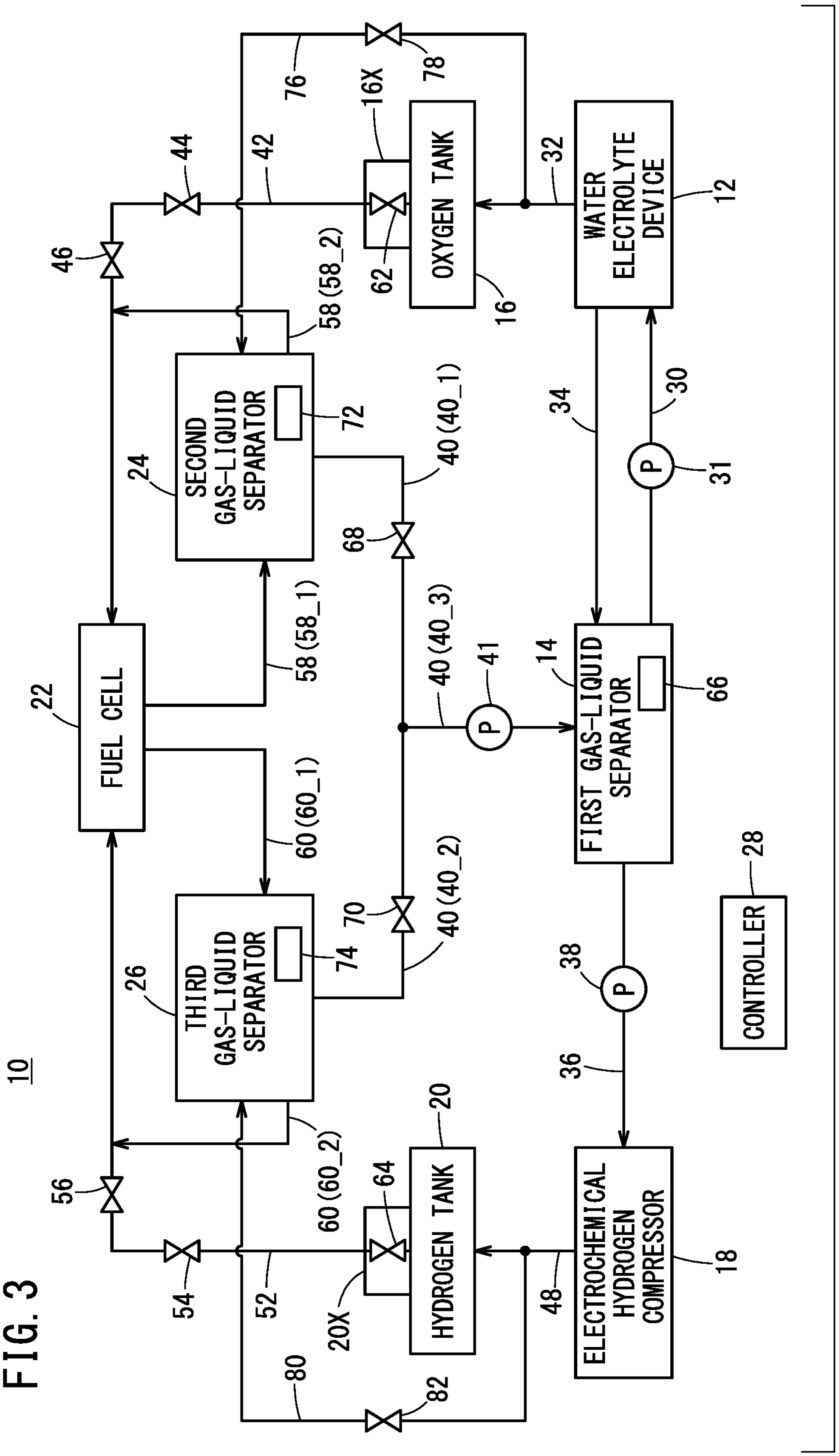
FIG. 3 is a schematic view showing a fuel cell system according to a modification.

FIG. 3 is a schematic view showing a fuel cell system 10 according to a modification. In the fuel cell system 10 according to the modification, a first bypass passage 76, a first bypass valve 78, a second bypass passage 80, and a second bypass valve 82 are newly provided.

The first bypass passage 76 is a conduit for supplying the oxygen gas pressurized by the water electrolysis device 12 to the second gas-liquid separator 24 while bypassing the oxygen tank 16. The first bypass passage 76 branches off from the oxygen discharge path 32, bypasses the oxygen tank 16, and communicates with the second gas-liquid separator 24.

The first bypass valve 78 is provided in the first bypass passage 76. The first bypass valve 78 is controlled by the controller 28. The controller 28 opens the first bypass valve 78 only when the level of the water in the first gas-liquid separator 14 becomes lower than a predetermined threshold value during the operation of the water electrolysis device 12 and the hydrogen compressor 18. In this case, the controller 28 opens the first bypass valve 78 while closing the oxygen valve 62 before opening the first on-off valve 68 and the second on-off valve 70. Thus, as in the embodiment, the stored water can be transferred to the first gas-liquid separator 14 while the high-pressure gas is supplied to the second gas-liquid separator 24. In addition, the high-pressure gas can be supplied to the second gas-liquid separator 24 without causing the fuel cell 22 to generate electric power.

The second bypass passage 80 is a conduit for supplying the hydrogen gas pressurized by the hydrogen compressor 18 to the third gas-liquid separator 26 while bypassing the hydrogen tank 20. The second bypass passage 80 branches off from the hydrogen discharge path 48, bypasses the hydrogen tank 20, and communicates with the third gas-liquid separator 26.

The second bypass valve 82 is provided in the second bypass passage 80. The second bypass valve 82 is controlled by the controller 28. The controller 28 opens the second bypass valve 82 only when the level of the water in the first gas-liquid separator 14 becomes lower than a predetermined threshold value during the operation of the water electrolysis device 12 and the hydrogen compressor 18. In this case, the controller 28 opens the second bypass valve 82 while closing the hydrogen valve 64 before opening the first on-off valve 68 and the second on-off valve 70. Thus, as in the embodiment, the stored water can be transferred to the first gas-liquid separator 14 while the high-pressure gas is supplied to the third gas-liquid separator 26. In addition, the high-pressure gas can be supplied to the third gas-liquid separator 26 without causing the fuel cell 22 to generate electric power.

Modified Embodiment 2

The water electrolysis device 12 may be replaced with a non-differential pressure water electrolysis device instead of the differential pressure water electrolysis device. The non-differential pressure water electrolysis device generates oxygen gas at a pressure higher than a reference pressure and hydrogen gas at a pressure higher than the reference pressure by water electrolysis. When the water electrolysis device 12 is replaced from the differential pressure water electrolysis device to the non-differential pressure water electrolysis device, the hydrogen compressor 18 is removed. In this case, the high-pressure hydrogen gas generated by the water electrolysis of the non-differential pressure water electrolysis apparatus is stored in the hydrogen tank 20 via the first gas-liquid separator 14.

A description will be given below concerning the invention and effects that are capable of being grasped from the above descriptions.

(1) The fuel cell system (10) includes: the water electrolysis device (12) configured to electrolyze water; the first gas-liquid separator (14) configured to separate a fluid discharged from the water electrolysis device into hydrogen gas and water to be resupplied to the water electrolysis device (12); the oxygen tank (16) configured to store an oxygen gas produced by water electrolysis and having been pressurized; the fuel cell (22) configured to generate electric power using the oxygen gas produced by the water electrolysis and having been pressurized; the second gas-liquid separator (24) configured to store water in a mixed gas including an unreacted oxygen gas discharged from the fuel cell (22); the water level sensor (66) configured to detect a level of the water stored in the first gas-liquid separator (14); and a controller (28) configured to control opening and closing of a valve; wherein the controller (28) supplies to the second gas-liquid separator (24) a higher pressure oxygen gas having a pressure higher than an internal pressure of the first gas-liquid separator (14) when the level of water becomes lower than a predetermined threshold value, regardless of a state of the fuel cell (22); and open the first on-off valve (68) disposed on the water supply path (40) connecting the first gas-liquid separator (14) to the second gas-liquid separator (24).

In this way, the water stored in the second gas-liquid separator can be transferred to the first gas-liquid separator while supplying the high-pressure gas to the second gas-liquid separator. Therefore, a decrease in the internal pressure of the second gas-liquid separator, otherwise caused by the transfer of water to the first gas-liquid separator, can be suppressed. As a result, it is possible to suppress a decrease in power generation efficiency of the fuel cell due to evaporation of water remaining in the second gas-liquid separator.

(2) In the fuel cell system (10), the controller (28) may close the oxygen valve (62) of the oxygen tank (16) to fill the oxygen tank (16) with the oxygen gas while the water electrolysis device (12) is in operation, open the oxygen valve (62) to supply the oxygen gas to the second gas-liquid separator (24) via the fuel cell (22) while the water electrolysis device (12) is not in operation, and perform valve-opening to supply the oxygen gas to the second gas-liquid separator (24) before opening the first on-off valve (68) when the level of water becomes lower than the threshold value while the water electrolysis device (12) is in operation. In this way, the water stored in the second gas-liquid separator can be transferred to the first gas-liquid separator while supplying the high-pressure gas to the second gas-liquid separator regardless of whether or not the water electrolysis device is in operation.

(3) In the fuel cell system (10), the oxygen valve (62) may be opened in the valve-opening to supply the oxygen gas, and a supply source of the oxygen gas to be supplied to the second gas-liquid separator (24) may be the oxygen tank (16). Accordingly, it is possible to supply the high-pressure gas to the second gas-liquid separator without additionally providing a pipe.

(4) The fuel cell system (10) may include: the first bypass valve (78) disposed on the first bypass passage (76) branched from an oxygen discharge path (32) connecting the water electrolysis device (12) to the oxygen tank (16), bypassing the oxygen tank (16), and connected to the second gas-liquid separator (24), and the first bypass valve (78) is opened in the valve-opening to supply the oxygen gas, and a supply source of the oxygen gas to be supplied to the second gas-liquid separator (24) may be the water electrolysis device (12). Thus, the high-pressure gas can be supplied to the second gas-liquid separator without causing the fuel cell to generate electric power.

(5) In the fuel cell system (10), the water electrolysis device (12) may be a differential pressure water electrolysis device that produces by water electrolysis the hydrogen gas and the oxygen gas having a pressure higher than a pressure of the hydrogen gas. Thus, compared to a case where the water electrolysis device is a non-differential pressure water electrolysis device that produces a high-pressure oxygen gas and a high-pressure hydrogen gas, it is possible to suppress an increase in the size of the pump for supplying water from the first gas-liquid separation to the water electrolysis device.

(6) The fuel cell system (10) may further include: an hydrogen compressor (18) configured to pressurize the hydrogen gas produced by the water electrolysis device (12), a hydrogen tank (20) configured to store the hydrogen gas pressurized by the hydrogen compressor (18), and a third gas-liquid separator (26) configured to store water in a mixed gas containing an unreacted hydrogen gas discharged from the fuel cell (22), wherein when the level of water becomes lower than a predetermined threshold value, the controller (28) supplies to the third gas-liquid separator (26) the hydrogen gas pressurized to have a pressure higher than the internal pressure of the first gas-liquid separator (14), regardless of the state of the fuel cell (22), and opens the second on-off valve (70) disposed on the water supply path (40) connecting the first gas-liquid separator (14) to the third gas-liquid separator (26). Thus, even if the amount of water stored in the second gas-liquid separator is small, the first gas-liquid separator can be replenished with water.

(7) In the fuel cell system (10), the controller (28) may close the hydrogen valve (64) provided in the hydrogen tank (20) to fill the hydrogen tank (20) with the hydrogen gas while the hydrogen compressor (18) is in operation, open the hydrogen valve (64) to supply the hydrogen gas to the third gas-liquid separator (26) via the fuel cell (22) during stop of the hydrogen compressor (18), and perform valve-opening to supply the hydrogen gas to the third gas-liquid separator (26) before opening the second on-off valve (70) when the level of water becomes lower than the threshold value while the hydrogen compressor (18) is in operation. Thus, the water stored in the third gas-liquid separator can be transferred to the first gas-liquid separator while supplying the high-pressure gas to the third gas-liquid separator, regardless of whether or not the hydrogen compressor is in operation.

(8) In the fuel cell system (10), the hydrogen valve (64) is opened in the valve-opening to supply the hydrogen gas, and the direct source of the hydrogen gas supplied to the third gas-liquid separator (26) may be the hydrogen tank (20). Accordingly, it is possible to supply the high-pressure gas to the third gas-liquid separator without additionally providing a pipe.

(9) The fuel cell system (10) includes: the second bypass valve (82) disposed on the second bypass passage (80) branched from the hydrogen discharge path (48) connecting the hydrogen compressor (18) to the hydrogen tank (20), bypassing the hydrogen tank (20), and connected to the third gas-liquid separator (26), and the second bypass valve (82) may be opened in the valve-opening to supply the hydrogen gas, and the direct source of the hydrogen gas supplied to the third gas-liquid separator (26) may be the hydrogen compressor (18). Thus, the high-pressure gas can be supplied to the third gas-liquid separator without causing the fuel cell to generate electric power.

(10) In the fuel cell system (10) of the present invention, the water supply path (40) may include the first water supply path (40_1) connecting the second gas-liquid separator (24) to the first gas-liquid separator (14) and the second water supply path (40_2) connecting the third gas-liquid separator (26) to the first gas-liquid separator (14), and when the level of water in the first gas-liquid separator (14) becomes lower than the predetermined threshold value, one of the second gas-liquid separator (24) and the third gas-liquid separator (26) having a level of water higher than the other may be brought into communication with the first gas-liquid separator (14). This makes it possible to reduce depletion of water in the second gas-liquid separator or the third gas-liquid separator due to transfer of water to the first gas-liquid separator.

The present invention is not particularly limited to the above-described embodiments and modifications, and various modifications can be made thereto within a range that does not deviate from the essence and gist of the present invention.

The invention claimed is:

1. A fuel cell system comprising:
- a water electrolysis device configured to electrolyze water;
- a first gas-liquid separator configured to separate a fluid discharged from the water electrolysis device into a hydrogen gas and water to be resupplied to the water electrolysis device;
- an oxygen tank configured to store an oxygen gas having been produced by water electrolysis and having been pressurized;
- a fuel cell configured to generate electric power using the oxygen gas having been produced by the water electrolysis and having been pressurized;
- a second gas-liquid separator configured to store water in a mixed gas including an unreacted oxygen gas discharged from the fuel cell;
- a water level sensor configured to detect a level of the water stored in the first gas-liquid separator; and
- one or more processors that execute computer-executable instructions stored in a memory, wherein the one or more processors execute the computer-executable instructions to cause the fuel cell system to:
- supply to the second gas-liquid separator the oxygen gas pressurized to have a pressure higher than an internal pressure of the first gas-liquid separator when the level of water becomes lower than a predetermined threshold value, regardless of a state of the fuel cell; and
- open a first on-off valve disposed on the water supply path connecting the first gas-liquid separator to the second gas-liquid separator.

2. The fuel cell system according to claim 1, wherein the one or more processors cause the controller to:
- close an oxygen valve of the oxygen tank to fill the oxygen tank with the oxygen gas while the water electrolysis device is in operation,
- open the oxygen valve to supply the oxygen gas to the second gas-liquid separator via the fuel cell while the water electrolysis device is not in operation, and
- perform valve-opening to supply the oxygen gas to the second gas-liquid separator before opening the first on-off valve when the level of water becomes lower than the threshold value while the water electrolysis device is in operation.

3. The fuel cell system according to claim 2, wherein
- the oxygen valve is opened in the valve-opening to supply the oxygen gas, and
- a direct source of the oxygen gas supplied to the second gas-liquid separator is the oxygen tank.

4. The fuel cell system according to claim 2, further comprising:
- a first bypass valve disposed on a first bypass passage branched from an oxygen discharge path connecting the water electrolysis device to the oxygen tank, bypassing the oxygen tank, and connected to the second gas-liquid separator, wherein
- the first bypass valve is opened in the valve-opening to supply the oxygen gas, and
- a direct source of the oxygen gas supplied to the second gas-liquid separator is the water electrolysis device.

5. The fuel cell system according to claim 1, wherein the water electrolysis device is a differential pressure water electrolysis device that is configured to produce by water electrolysis the hydrogen gas and the oxygen gas having a pressure higher than a pressure of the hydrogen gas.

6. The fuel cell system according to claim 1, further comprising:
- a hydrogen compressor configured to pressurize the hydrogen gas produced by the water electrolysis device,
- a hydrogen tank configured to store the hydrogen gas pressurized by the hydrogen compressor, and
- a third gas-liquid separator configured to store water in a mixed gas containing an unreacted hydrogen gas discharged from the fuel cell, wherein
- the one or more processors cause the fuel cell system to:
- supply to the third gas-liquid separator the hydrogen gas pressurized to have a pressure higher than the internal pressure of the first gas-liquid separator when the level of water becomes lower than the predetermined threshold value, regardless of the state of the fuel cell, and
- open a second on-off valve disposed on the water supply path connecting the first gas-liquid separator to the third gas-liquid separator.

7. The fuel cell system according to claim 6, wherein
- the one or more processors cause the fuel cell system to:
- close a hydrogen valve of the hydrogen tank to fill the hydrogen tank with the hydrogen gas while the hydrogen compressor is in operation,
- open the hydrogen valve to supply the hydrogen gas to the third gas-liquid separator via the fuel cell during stop of the hydrogen compressor, and
- perform valve-opening to supply the hydrogen gas to the third gas-liquid separator before opening the second on-off valve when the level of water becomes lower than the threshold value while operation of the hydrogen compressor is in operation.

8. The fuel cell system according to claim 7, wherein
- the hydrogen valve is opened in the valve-opening to supply the hydrogen gas, and
- a direct source of the hydrogen gas supplied to the third gas-liquid separator is the hydrogen tank.

9. The fuel cell system according to claim 7, further comprising:
- a second bypass valve disposed on a second bypass passage branched from the hydrogen discharge path connecting the hydrogen compressor to the hydrogen tank, bypassing the hydrogen tank, and connected to the third gas-liquid separator, wherein the second bypass valve is opened in the valve-opening to supply the hydrogen gas, and a direct source of the hydrogen gas supplied to the third gas-liquid separator is the hydrogen compressor.

10. The fuel cell system according to claim 6, wherein the water supply path include a first water supply path connecting the second gas-liquid separator to the first gas-liquid separator and a second water supply path connecting the third gas-liquid separator to the first gas-liquid separator, and the one or more processors cause the fuel cell system to:

bring one of the second gas-liquid separator and the third gas-liquid separator having a level of water higher into communication with the first gas-liquid separator when the level of water in the first gas-liquid separator becomes lower than the predetermined threshold value.

* * * * *